United States Patent
Yi et al.

(10) Patent No.: US 7,460,197 B2
(45) Date of Patent: Dec. 2, 2008

(54) COLOR FILTER SUBSTRATE HAVING A PANEL IDENTIFICATION AND MANUFACTURING METHOD THEREOF

(75) Inventors: Jong-Hoon Yi, Seoul (KR); Hong-Suk Yoo, Gyeonggi-do (KR)

(73) Assignee: LG Displays Co., Ltd., Seoul (KR)

( * ) Notice: Subject to any disclaimer, the term of this patent is extended or adjusted under 35 U.S.C. 154(b) by 324 days.

(21) Appl. No.: 11/501,051

(22) Filed: Aug. 9, 2006

(65) Prior Publication Data

US 2006/0268205 A1   Nov. 30, 2006

Related U.S. Application Data

(62) Division of application No. 11/150,321, filed on Jun. 13, 2005, now Pat. No. 7,102,710, which is a division of application No. 10/032,278, filed on Dec. 31, 2001, now Pat. No. 6,914,263.

(30) Foreign Application Priority Data

May 14, 2001   (KR)   ................................ 2001-26227

(51) Int. Cl.
*G06F 1/1335*   (2006.01)
*G06F 1/1333*   (2006.01)

(52) U.S. Cl. ....................................... 349/106; 349/110

(58) Field of Classification Search ................. 349/106, 349/110, 187
See application file for complete search history.

(56) References Cited

U.S. PATENT DOCUMENTS

| 5,361,150 | A |   | 11/1994 | Noguchi |
| 5,633,739 | A |   | 5/1997 | Matsuyama et al. |
| 5,952,129 | A |   | 9/1999 | Kiguchi et al. |
| 6,597,427 | B1 | * | 7/2003 | Katsu et al. ................. 349/192 |
| 6,650,394 | B1 |   | 11/2003 | Kim et al. |
| 6,667,792 | B2 | * | 12/2003 | Park et al. .................... 349/158 |
| 6,734,931 | B2 | * | 5/2004 | Yu ............................... 349/106 |

FOREIGN PATENT DOCUMENTS

| JP | 08-106153 | 4/1996 |
| JP | 2001-235613 | 8/2001 |
| JP | 2002-192534 | 7/2002 |
| JP | 2002-311226 | 10/2002 |

* cited by examiner

*Primary Examiner*—Mike Qi
(74) *Attorney, Agent, or Firm*—Morgan Lewis & Bockius LLP

(57) ABSTRACT

A color filter substrate for a liquid crystal display device includes a substrate, a plurality of black matrix regions on the substrate, a plurality of color filter layers, each disposed between adjacent ones of the plurality of black matrix regions, a panel identification at an edge of the substrate spaced apart from the plurality of black matrix regions, the panel identification and the plurality of color filter layers include a same material, an overcoat layer on the plurality of color filter layers, and a common electrode on the overcoat layer.

7 Claims, 7 Drawing Sheets

COLOR FILTER SUBSTRATE HAVING A PANEL IDENTIFICATION AND MANUFACTURING METHOD THEREOF

This application is a Divisional of U.S. patent application Ser. No. 11/150,321 filed Jun. 13, 2005 now U.S. Pat No. 7,102,710, which is a Divisional of U.S. patent application Ser. No. 10/032,278 filed Dec. 31, 2001, now U.S. Pat. No. 6,914,263, and claims the benefit of Korean Patent Application No. 2001-26227, filed on May 14, 2001 in Korea, all of which are hereby incorporated by reference.

BACKGROUND OF THE INVENTION

1. Field of the Invention

The present invention relates to a color filter substrate of a liquid crystal display (LCD) device, and more particularly, to a fabricating method of a color filter substrate having a panel identification (ID).

2. Description of the Related Art

A conventional LCD device displays images according to changes of light transmittance. In the conventional LCD device, two substrates are disposed facing each other with a liquid crystal material layer interposed therebetween. Liquid crystal molecules of the liquid crystal material layer are aligned by application of an electric field between electrodes formed on the two substrates.

FIG. 1 is a schematic cross-sectional view of a LCD device according to the related art. In FIG. 1, a gate electrode 21, which is formed of a conductive material such as a metal, is formed on a transparent lower substrate 10, commonly referred to as an array substrate, and a gate insulating layer 30 that is formed of silicon nitride (SiNx) or silicon oxide ($SiO_2$) covers the gate electrode 21. An active layer 41, which is formed of amorphous silicon, is formed on the gate insulating layer 30 over the gate electrode 21, and an ohmic contact layer 51 and 52, which is formed of doped amorphous silicon, is formed on the active layer 41. A source electrode 61 and a drain electrode 62, which are formed of a conductive material, are formed on the ohmic contact layer 51 and 52, thereby constructing a TFT "T" with the gate electrode 21. The gate and source electrodes 21 and 61 are connected to a gate line (not shown) and a data line (not shown), respectively, and a pixel region is defined by the gate and data lines. Furthermore, a passivation layer 70, which is formed of SiNx, $SiO_2$ or organic insulating material, is formed on the source and drain electrodes 61 and 62. The passivation layer 70 has a contact hole 71 exposing a portion of the drain electrode 62. A pixel electrode 81 is formed on the passivation layer 70 at the pixel region, and is connected to the drain electrode 62 through the contact hole 71.

A transparent upper substrate 90, commonly referred to as a color filter substrate, faces and is spaced apart from the lower substrate 10. A black matrix 91 is formed on an inner side of the upper substrate 90, and is disposed at a portion corresponding to the TFT "T." A color filter layer 92, which is formed of red (R), green (G) and blue (B) colors, is formed on the black matrix 91. Positions of the three colors (R, G and B) alternate, wherein one color corresponds to one pixel region. A common electrode 93, which is formed of transparent conductive material, is formed on the color filter layer 92. Moreover, orientation films (not shown) are formed on the pixel and common electrodes 81 and 93, and a liquid crystal material layer 100 is interposed therebetween.

The LCD device according to the related art is fabricated through processes for fabricating the upper and lower substrates, and a process for fabricating a liquid crystal cell. The TFT and the pixel electrode are formed during the process for fabricating the lower substrate, and the color filter layer and the common electrode are formed during the process for fabricating the upper substrate. During the process for fabricating the liquid crystal cell, the following steps are performed: attachment of the upper and lower substrates; injection of a liquid crystal material; sealing an injection hole; and forming a polarizing plate.

FIG. 2 is a flow chart illustrating a fabrication process of a liquid crystal cell for an LCD device according to the related art. In FIG. 2, at step ST1, the lower and upper substrates are formed to include TFT's and color filters, respectively. The lower substrate is formed by repeating deposition and patterning steps of a thin film using several masks. The upper substrate is formed by subsequently forming a black matrix, red (R), green (G), and blue (B) color filters, and a common electrode. The black matrix distinguishes the color filters, and prevents light leakage within a non-pixel area. The color filter can be formed by a dyeing method, a printing method, a pigment dispersion method, an inkjet method, or an electrodeposition method. The pigment dispersion method is commonly employed.

At step ST2, an orientation film, which determines an initial orientation of the liquid crystal material layer, is formed on the upper and lower substrates, and includes deposition and alignment of a polymeric thin film along a specific orientation direction. An organic material of a polyimide series is commonly used as the orientation film, and a rubbing method is commonly used as the orientation alignment method of the orientation film. The rubbing method includes rubbing the orientation film along the specific orientation direction with a rubbing cloth, and is advantageous for providing an easy orientation treatment, suitability to mass production, high stability of the orientation, and easy controllability of a pre-tilt angle.

At step ST3, a seal pattern, which forms a gap for liquid crystal material injection and prevents leakage of the liquid crystal material, is formed on one substrate. The seal patterning process involves forming a desired pattern by application of a thermosetting plastic, and includes a screen print method using a screen mask and a seal dispenser method using a dispenser. For simplicity of fabrication, the screen print method is commonly used. However, since the screen mask may not suitable for a wide substrate, and contamination by contact between the mask and the orientation film commonly occurs, use of the seal dispenser method has gradually become commonplace.

At step ST4, a spacer, which has a specific size to maintain a precise and uniform gap between the upper and lower substrates, is deposited by spraying the spacer onto one of the upper and lower substrates. The spacer spray method can be divided into two different types: a wet spray method that involves spraying a mixture of alcohol and spacer material; and a dry spray method that involves spraying spacer material alone. Furthermore, the dry spray method can be sub-divided into two different types: an electrostatic spray method that uses electrostatic force; and a non-electric spray method that uses gas pressure. Since the liquid crystal cell structure is susceptible to damage from static electricity, the non-electric method is commonly used.

At step ST5, the upper and lower substrates are attached by pressure-added hardening of the seal pattern.

At step ST6, the attached substrates are divided into unit cells. A cell cutting process includes a scribe procedure that forms cutting lines on a surface of the substrate using a diamond pen, and a break procedure that divides the unit cells by application of force.

At step ST7, a liquid crystal material is injected into the unit cells. A vacuum injection method that makes use of pressure differences between the inside and outside of the unit cells is commonly used as an effective injection method. Since fine air bubbles present in the liquid crystal material can deteriorate the display property of the unit cells, a bubble-eliminating process in which the cells are kept in a vacuum state for an extended period of time is required. After completing the liquid crystal material injection process, an injection hole is sealed to prevent leakage of the liquid crystal material. Generally, an ultra violet (UV) curable resin is deposited into the injection hole by use of a dispenser, and ultra violet light is irradiated onto the resin, thereby hardening the resin and sealing the injection hole.

At step ST8, polarizing plates are attached on outer surfaces of the unit cell, and a driving circuit is connected to the unit cell using an attachment process.

To distinguish each substrate during the fabricating process of an LCD device, a panel identification (ID) is inscribed on an edge of the substrate. The panel ID of the array substrate is formed during one of the processes for forming the various layers, which include deposition, photolithography, and etching. On the other hand, the panel ID of the color filter substrate is generally formed during the process for forming the black matrix.

FIGS. 3A to 3C are schematic cross-sectional views showing a manufacturing process of a color filter substrate according to the related art.

In FIG. 3A, a metallic material 120 is deposited on a substrate 110, a photoresist material is coated on the metallic material 120, and light is irradiated onto the photoresist material. The substrate 110 includes a first region "A," where images are to be displayed, and a second region "B," which is outside of the first region "A." The first region "A" is exposed by using a photomask to form a black matrix, and the second region "B" is exposed by using a laser to form the panel ID. Since the panel ID of each substrate is different, the panel ID cannot be formed by using only one photomask.

In FIG. 3B, after development of the exposed photoresist material 130 (of FIG. 3A) and etching of the metallic material 120 (of FIG. 3A) under the photoresist material, the developed photoresist material 130 (of FIG. 3A) is removed from the substrate 110. A plurality of black matrix regions 121 are formed in the first region "A," and a panel ID 122 is formed in the second region "B."

In FIG. 3C, red "R," green "G," and blue "B" color filter layers 140 are subsequently formed between each of the plurality of black matrix regions 121 of the first region "A." An overcoat layer 150 is formed on the color filter layers 140. A common electrode 160, which is formed of a transparent material, is formed on the overcoat layer 150. The plurality of black matrix regions 121 are made of a metallic material or a resin. Accordingly, the panel ID can be made during the forming process of the plurality of black matrix regions 121.

During the manufacturing process, the panel ID is formed by an additional laser marking process, such as a laser exposure process. Furthermore, an additional process for forming the panel ID will be necessary when the manufacturing process does not include the forming process of the plurality of black matrix regions. Therefore, the fabrication processing time for forming the color filter substrate increases, thereby reducing fabrication yield and increasing fabrication costs.

SUMMARY OF THE INVENTION

Accordingly, the present invention is directed to a forming method of a panel identification of a color filter substrate that substantially obviates one or more of the problems due to limitations and disadvantages of the related art.

An object of the present invention is to provide a color filter substrate having a panel identification and a manufacturing method thereof that simplifies fabrication processing and reduces costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate for a liquid crystal display device includes a substrate, a plurality of black matrix regions on the substrate, a plurality of color filter layers, each disposed between adjacent ones of the plurality of black matrix regions, a panel identification at an edge of the substrate spaced apart from the plurality of black matrix regions, the panel identification and the plurality of color filter layers include a same material, an overcoat layer on the plurality of color filter layers, and a common electrode on the overcoat layer.

In another aspect, a color filter substrate for a liquid crystal display device includes a substrate, a plurality of black matrix regions on the substrate, a panel identification at an edge of the substrate spaced apart from the plurality of black matrix regions, the panel identification and the black matrix include a same material, a plurality of color filter layers on the substrate, an overcoat layer on the plurality of color filter layers, and a common electrode on the overcoat layer, wherein a thickness of the plurality of black matrix regions equal to a thickness of the plurality of color filter layers.

In another aspect, a manufacturing method of a color filter substrate for a liquid crystal display device includes forming a plurality of black matrix regions on a substrate, forming a plurality of color filter layers, each disposed between adjacent ones of the plurality of black matrix regions, forming a panel identification at an edge of the substrate spaced apart from the plurality of black matrix regions, forming an overcoat layer on the plurality of color filter layers, and forming a common electrode on the overcoat layer, wherein the panel identification and the plurality of color filter layers are formed from a same material.

In another aspect, a manufacturing method of a color filter substrate for a liquid crystal display device includes forming a plurality of black matrix regions on a substrate, forming a plurality of color filter layers of a first material, each disposed between adjacent ones of the plurality of black matrix regions, and forming a panel identification of the first material on the substrate spaced apart from the plurality of black matrix regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to similar parts.

FIGS. 4A to 4E are schematic cross-sectional views showing an exemplary manufacturing process of a color filter substrate according to the present invention.

Figure 1:
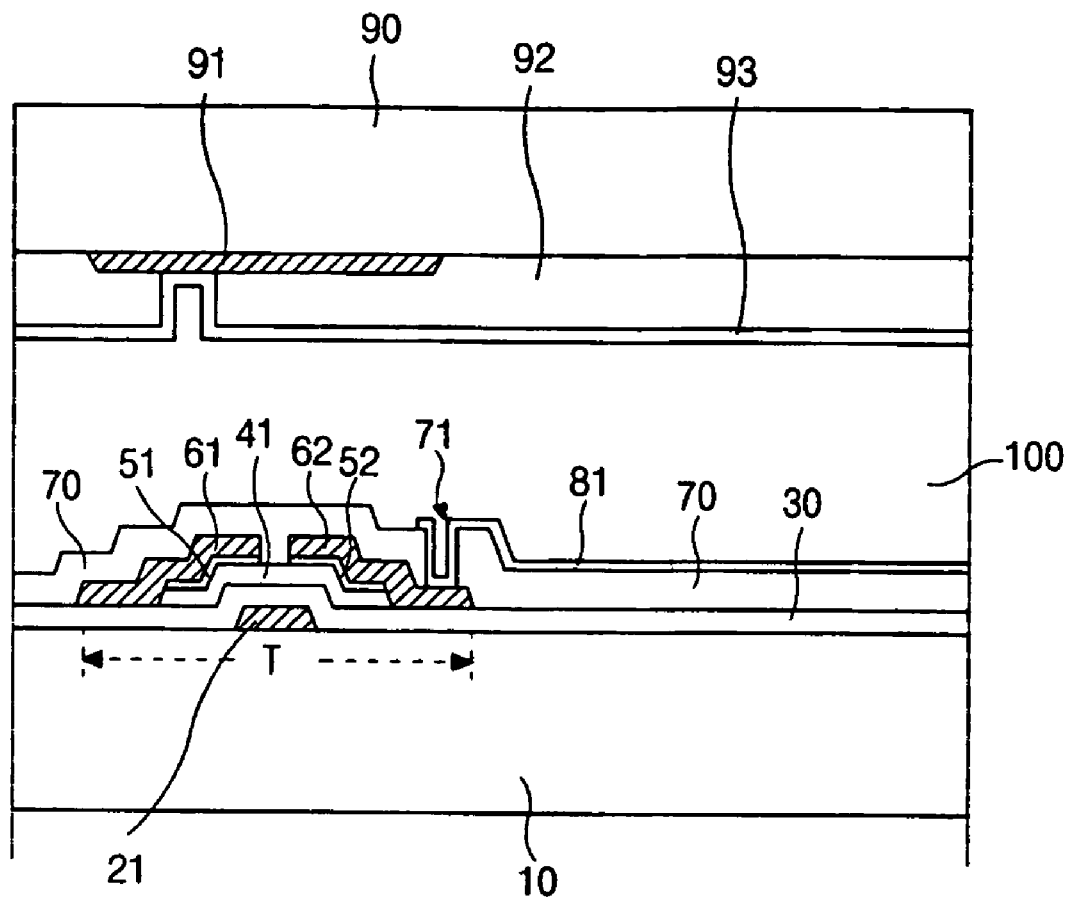
FIG. 1 is a schematic cross-sectional view of an LCD device according to the related art.
Figure 2:
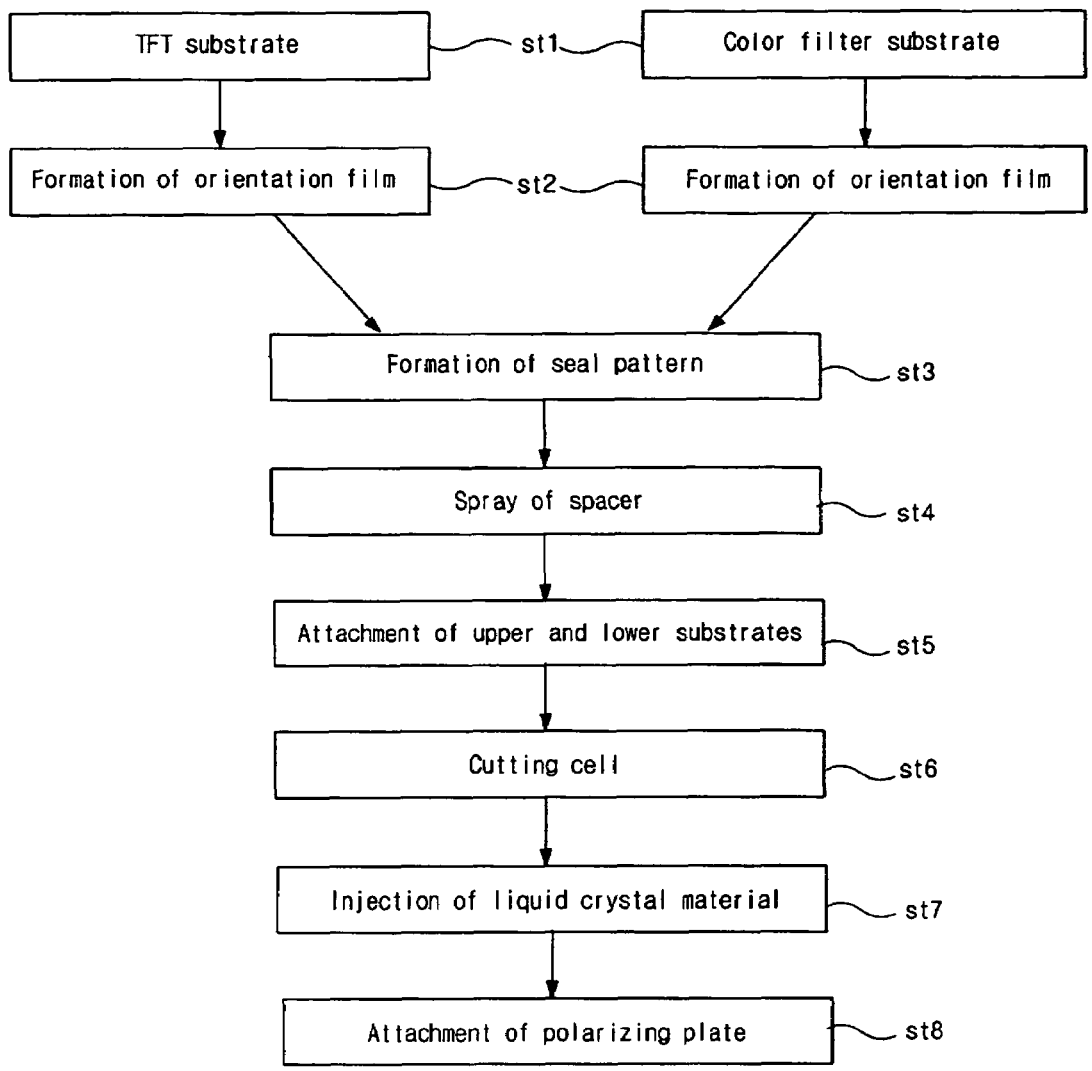
FIG. 2 is a flow chart illustrating a fabrication process of a liquid crystal cell for an LCD device according to the related art.
Figure 3A:
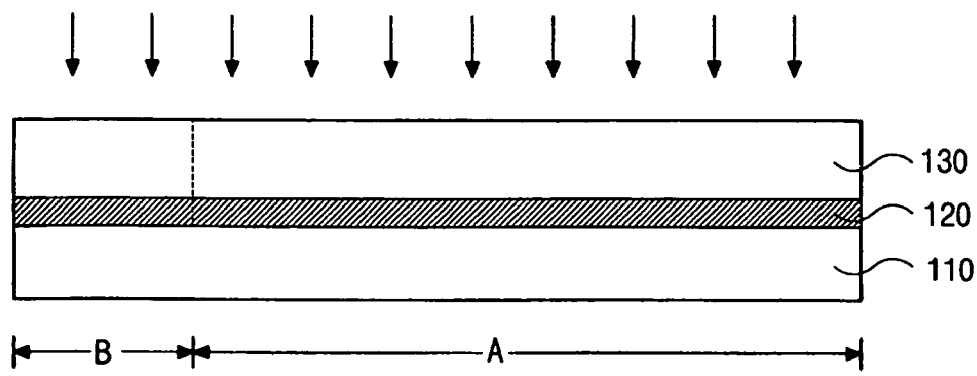
FIGS. 3A to 3C are schematic cross-sectional views showing a manufacturing process of a color filter substrate according to the related art.
Figure 3B:
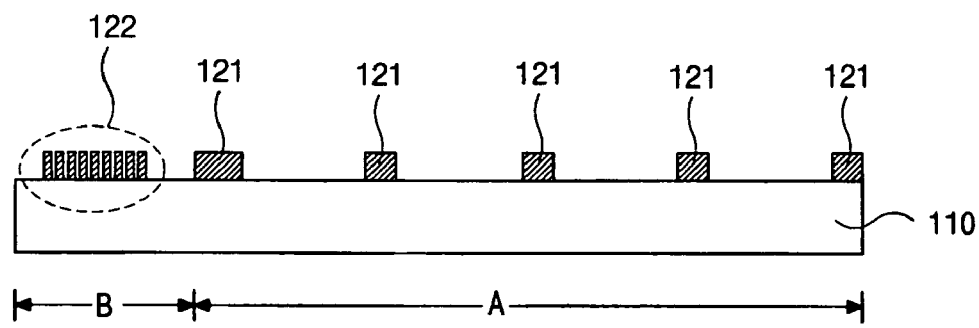
Figure 3C:
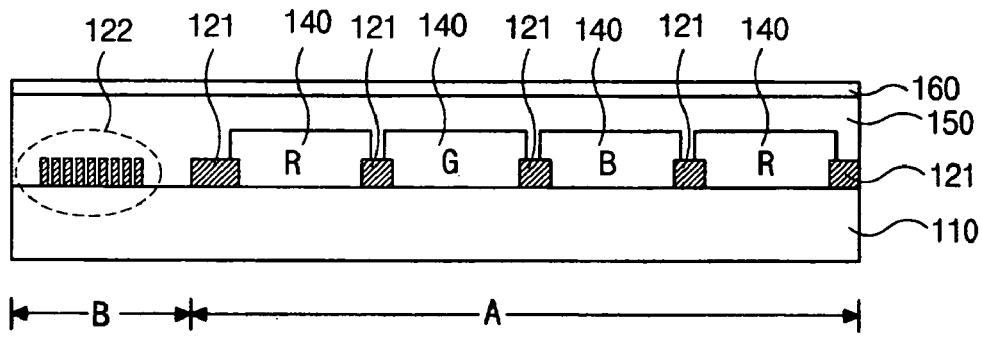
Figure 4A:
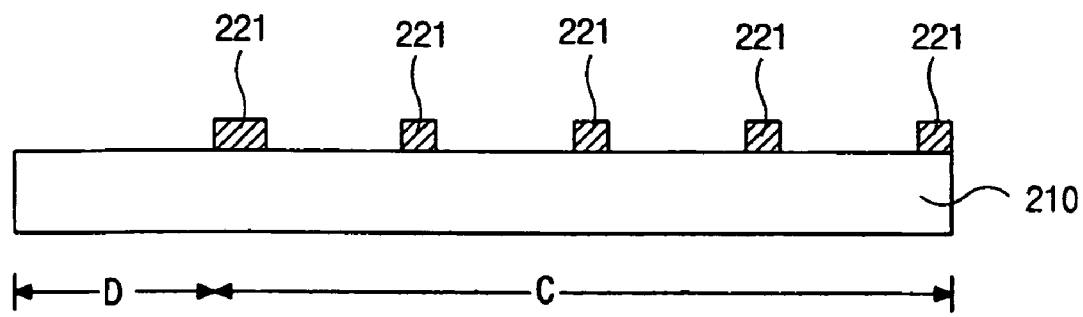
FIGS. 4A to 4E are schematic cross-sectional views showing an exemplary a manufacturing process of a color filter substrate according to the present invention.

In FIG. 4A, a plurality of black matrix regions 221 may be formed on a substrate 210. The substrate 210 may include a first region "C," where images are to be displayed, and a second region "D," which is outside of the first region "C." The plurality of black matrix regions 221 may be formed of a metallic material or a resin, for example.

Figure 4B:
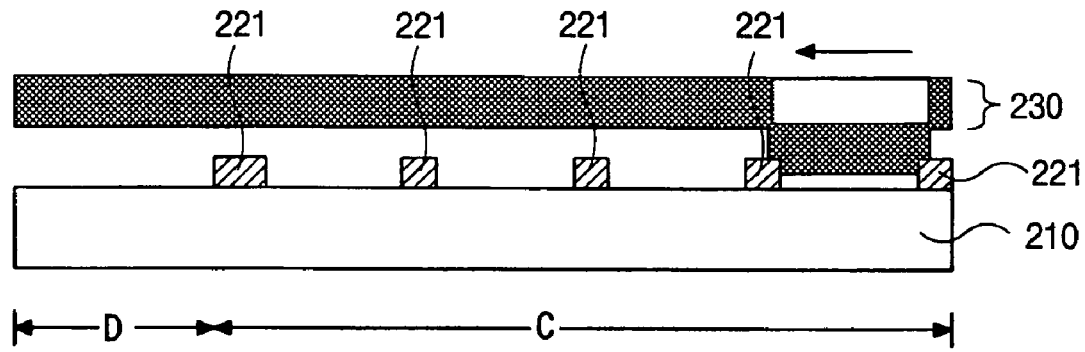

In FIG. 4B, a red laser-sensitive film 230, which is sensitive to red laser light, may be disposed over the substrate 210, and a mask (not shown) may be disposed on the red laser-sensitive film 230. Then, red laser light may be scanned onto the red laser-sensitive film 230, thereby instantaneously heating portions of the red laser-sensitive film 230. Then, the heated portions are transcribed onto the substrate 210 between adjacent ones of the plurality of black matrix regions 221.

Figure 4C:
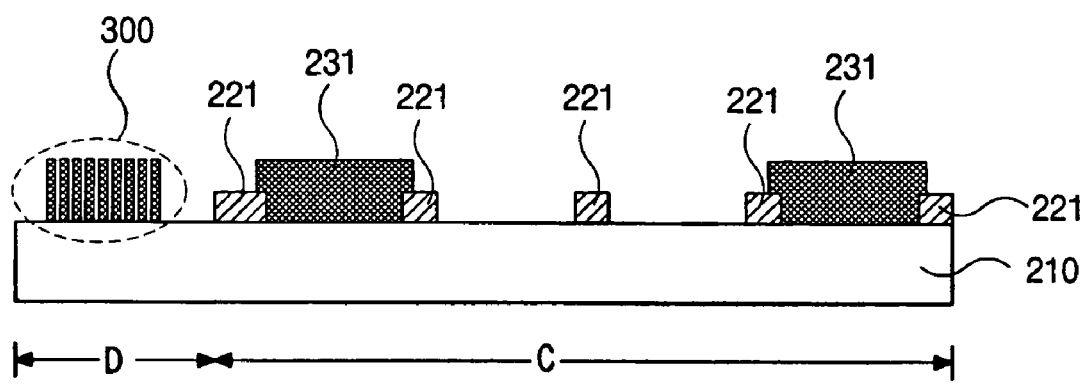

In FIG. 4C, a plurality of red color filter layers 231 may be formed at open portions between the adjacent ones of the plurality of black matrix regions 221 in the first region "C," and a panel ID 300 may be formed in the second region "D."

Figure 4D:
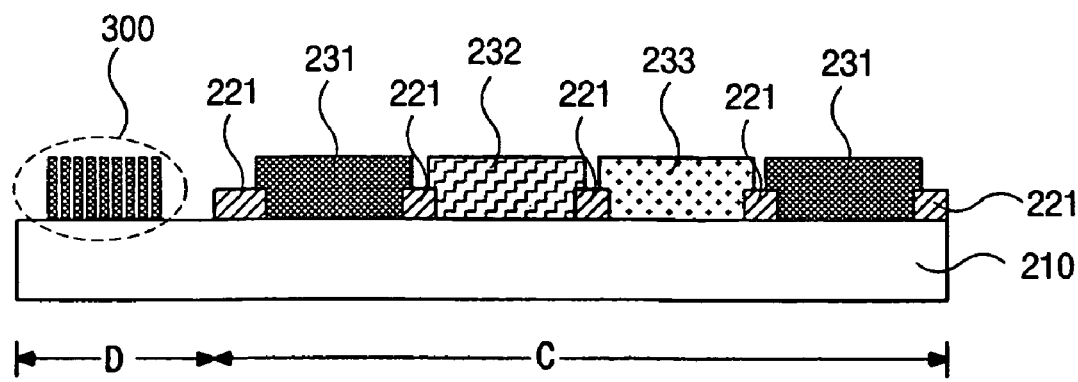

In FIG. 4D, a green color filter layer 232 and a blue color filter layer 233 may be subsequently formed in a similar manner to the process for forming the plurality of red color filter layers 231, using corresponding color laser-sensitive films.

Figure 4E:
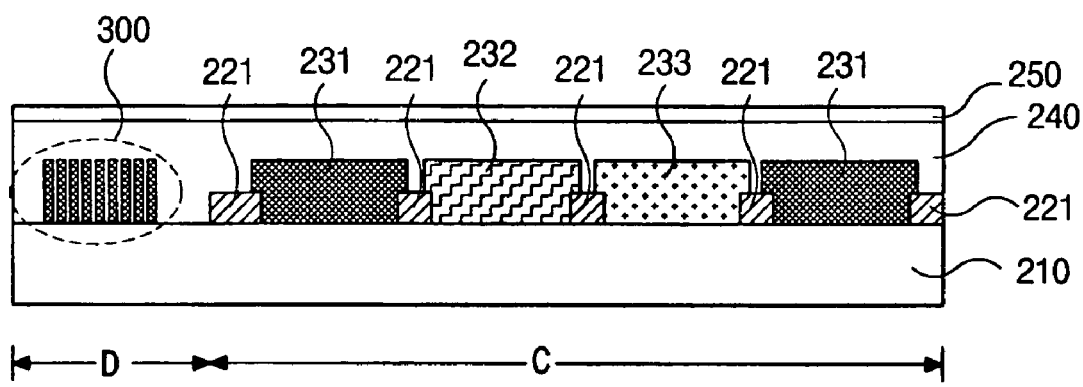

In FIG. 4E, an overcoat layer 240 may be formed on the color filter layers 231, 232 and 233 for protection, and a common electrode 250 of a transparent conductive material such as indium tin oxide (ITO), for example, may be formed on the overcoat layer 240. The overcoat layer 240 provides a planarized surface above stepped surfaces of the color filter layers 231, 232 and 233 and the panel ID.

Although the panel ID is simultaneously formed during the process for forming the red color filter layer, the panel ID may be formed with the green and/or blue color filter layers, either in combination or separately. Moreover, if the black matrix is formed by a process such as the process for forming the color filter layers, the panel ID may be formed during the process for forming the black matrix.

FIGS. 5A to 5D are schematic cross-sectional views showing another exemplary manufacturing process of a color filter substrate according to the present invention.

Figure 5A:
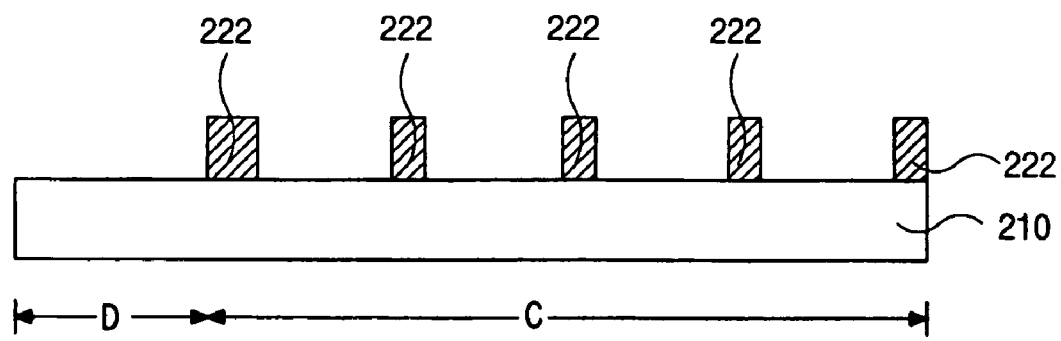
FIGS. 5A to 5D are schematic cross-sectional views showing another exemplary manufacturing process of a color filter substrate according to the present invention.

In FIG. 5A, a plurality of partition walls 222 formed of a resin, for example, may be formed at a first region "C" of a substrate 210, which includes a first region "C" and a second region "D." The plurality of partition walls 222 define regions for forming a plurality of color filter layers. The plurality of partition walls may include a light absorbing material to function as a black matrix.

Figure 5B:
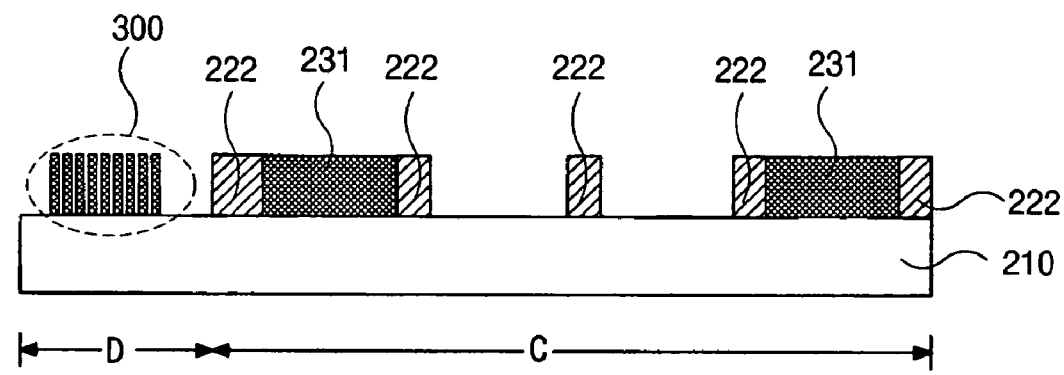

In FIG. 5B, a plurality of red color filter layers 231 may be formed within regions defined by adjacent ones of the plurality of partition walls 222 in the first region "C," and a panel ID 300 may be formed within the second region "D" by a red ink jet process.

Figure 5C:
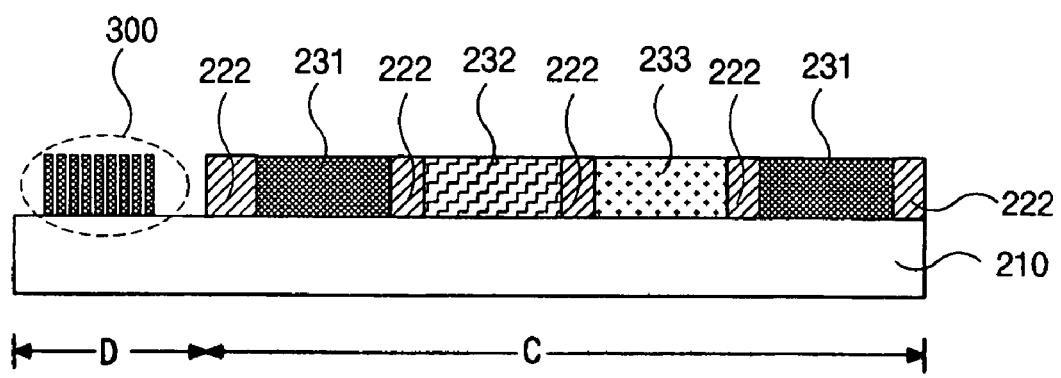

In FIG. 5C, at least one green color filter layer 232 and at least one blue color filter layer 233 may be subsequently formed by a green ink jet process and a blue ink jet process, respectively.

Figure 5D:
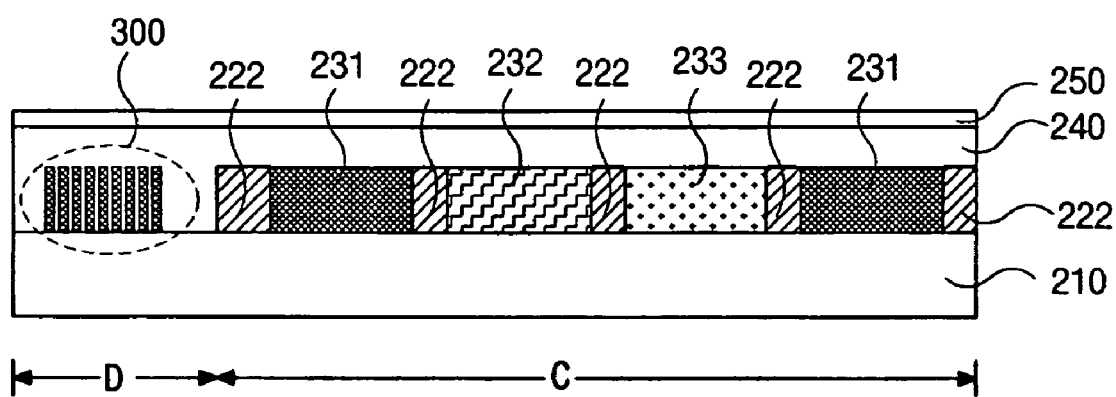

In FIG. 5D, an overcoat layer 240 may be formed on the color filter layers 231, 232 and 233, and a common electrode 250 of a transparent conductive material may be formed on the overcoat layer 240.

Even though the panel ID is simultaneously formed during the formation of the plurality of red color filter layers in the present invention, the panel ID may be formed during formation of the green and/or blue color filter layers, either in combination or separately. Moreover, if the black matrix is formed by a process similar to the process for forming the color filter layers, the panel ID may be formed during the process for forming the black matrix. Furthermore, the fabricating method of the color filter substrate according to the present invention can be applied to the color filter substrate without the black matrix.

It will be apparent to those skilled in the art that various modifications and variations can be made in the liquid crystal display devices of the present invention without departing from the spirit or scope of the invention. Thus, it is intended that the present invention covers the modifications and variations of this invention provided they come within the scope of the appended claims and their equivalents.

What is claimed is:

1. A manufacturing method of a color filter substrate for a liquid crystal display device, comprising:
   forming a plurality of black matrix regions on a substrate;
   forming a plurality of color filter layers of a first material, each disposed between adjacent ones of the plurality of black matrix regions; and
   forming a panel identification of the first material on the substrate spaced apart from the plurality of black matrix regions.

2. The method according to claim 1, wherein the step of forming a plurality of color filter layers includes forming a photosensitive film on the plurality of black matrix regions.

3. The method according to claim 2, wherein the step of forming a plurality of color filter layers includes irradiating laser light onto the photosensitive film.

4. The method according to claim 1, wherein the step of forming a plurality of color filter layers and the step of forming a panel identification are performed simultaneously.

5. The method according to claim 1, wherein an uppermost surface of each of the plurality of black matrix regions is at least as high as an uppermost surface of each of the plurality of color filter layers from a surface of the substrate.

6. The method according to claim 1, wherein an uppermost surface of each of the plurality of color filter layers is at least as high as an uppermost surface of each of the plurality of black matrix regions from a surface of the substrate.

7. The color filter substrate according to claim 1, wherein an uppermost surface of each of the plurality of black matrix regions is at least as high as an uppermost surface of the panel identification from a surface of the substrate.

* * * * *